United States Patent

[11] 3,548,099

[72] Inventor George Cleveland Waybright
Batavia, N.Y.
[21] Appl. No. 734,493
[22] Filed June 4, 1968
[45] Patented Dec. 15, 1970
[73] Assignee Sylvania Electric Products Inc.
a corporation of Delaware

[54] DEFLECTION CIRCUITRY FOR COLOR REPRODUCTION SYSTEM

6 Claims, 2 Drawing Figs.

[52] U.S. Cl. .......... 178/7.7, 178/6.8, 178/7.9
[51] Int. Cl. .......... H04n 3/16, H04n 5/36, H04n 7/18
[50] Field of Search .......... 178/6, 6.8, 6(PD), 7.9, 7.7; 315/(Inquired); Lib/(CRT Displays)

[56] References Cited

UNITED STATES PATENTS 3,128,333 4/1964 Loughlin .......... 178/5.2A

FOREIGN PATENTS 1,014,157 8/1957 Germany .......... 178/6PD
854,889 1/1940 France .......... 178/6PD

*Primary Examiner*—Robert L. Richardson
*Assistant Examiner*—Howard W. Britton
*Attorneys*—Norman J. O'Malley, Cyril A. Krenzer and Thomas H. Buffton

ABSTRACT: A color reproduction system includes a flying spot scanner tube to scan a frame of film, an optical-to-electrical signal transducer to provide electrical signal components representative of the image on the frame of film being scanned, which signals are suitably processed and applied to a television receiver to provide a display of the image on the film. The deflection circuitry for the flying spot scanner tube is connected in parallel with the deflection circuitry of the cathode ray tube in the television receiver. The source of deflection signals is obtained from the television receiver in a conventional manner and the deflection circuitry for the flying spot scanner cathode ray tube is optimized so that the basic television receiver design is relatively unaffected.

PATENTED DEC 15 1970 3,548,099

INVENTOR.
GEORGE C. WAYBRIGHT
BY
Cyril A. Krenzer
ATTORNEY

DEFLECTION CIRCUITRY FOR COLOR REPRODUCTION SYSTEM

BACKGROUND OF THE INVENTION

A need has long existed for an improved consumer product capable of providing a visual display of photographic films. The present display devices for this purpose rely almost solely on optical projection systems, which have a number of inherent disadvantages. For example, a film optically projected generally requires a very low ambient light condition, which for the most part dictates using only in a darkened room and primarily at night. Also, because the film image is optically projected, there is no known acceptable means capable of compensating for slightly overexposed or slightly underexposed film. In addition the optical projection systems use high intensity lamps which generate a considerable amount of heat thereby requiring relatively complex and expensive compensation means to prevent film damage because of the heat exposure. The heat also tends to deform the film, thereby requiring some sort of automatic focusing control if a suitable image display is to result.

From the point of view of working or operating in a relatively high ambient light condition and further of providing control means to compensate for slight degradations in film quality, a television receiver type of display has several significant advantages over an optical projection type of display system. However all known apparatus for providing a televised display of a photographic film is found solely in the area of studio type equipment, which is extremely expensive and therefore not readily available to the general consumer public.

For such a system to be acceptable and within the reach of the consuming public, the system must be relatively inexpensive, reliable and simple both in operation and maintenance. From a practical point of view, a television type of display for films must also be capable of receiving normal television programs to reduce the effective cost of the system to the public.

In particular, to generate a suitable display of a film on a television receiver, there must be some means for scanning the film to derive therefrom the necessary signal information, which is then suitably processed and applied to the television receiver for display. The scanning of the film must be accurately synchronized with the television receiver scanning system if an intelligible display is to result.

OBJECTS AND SUMMARY OF THE INVENTION

Therefore, it is an object of this invention to provide a color reproduction system capable of displaying the image of a frame on a television receiver.

Another object of this invention is to provide such a color reproduction system which is economical, reliable and relatively simple in operation.

A particular object of this invention is to provide improved scanning apparatus for use in the above-mentioned color reproduction system.

A still more particular object of the invention is to provide improved vertical scanning circuitry and apparatus for use in the aforementioned color reproduction system.

These and other objects and advantages are achieved in one aspect of the invention by a reproduction system which utilizes a flying spot scanner tube to scan a frame of film, an optical-to-electrical transducer to develop electrical signals corresponding to the information derived from the scanning of the frame of film, signal processing apparatus to adapt the signals for application to a television receiver and a television receiver adapted to receive the signals so developed and provide the desired image display. The synchronized scanning of the flying spot scanner tube and the television receiver cathode ray tube is accomplished by connecting the deflection apparatus of the two tubes in parallel and driving the deflection from a common source.

DESCRIPTION OF THE PREFERRED EMBODIMENTS

For a better understanding of the present invention, together with other and further objects, advantages and capabilities thereof, reference is made to the following disclosure in connection with the above-described drawings.

Figure 1:
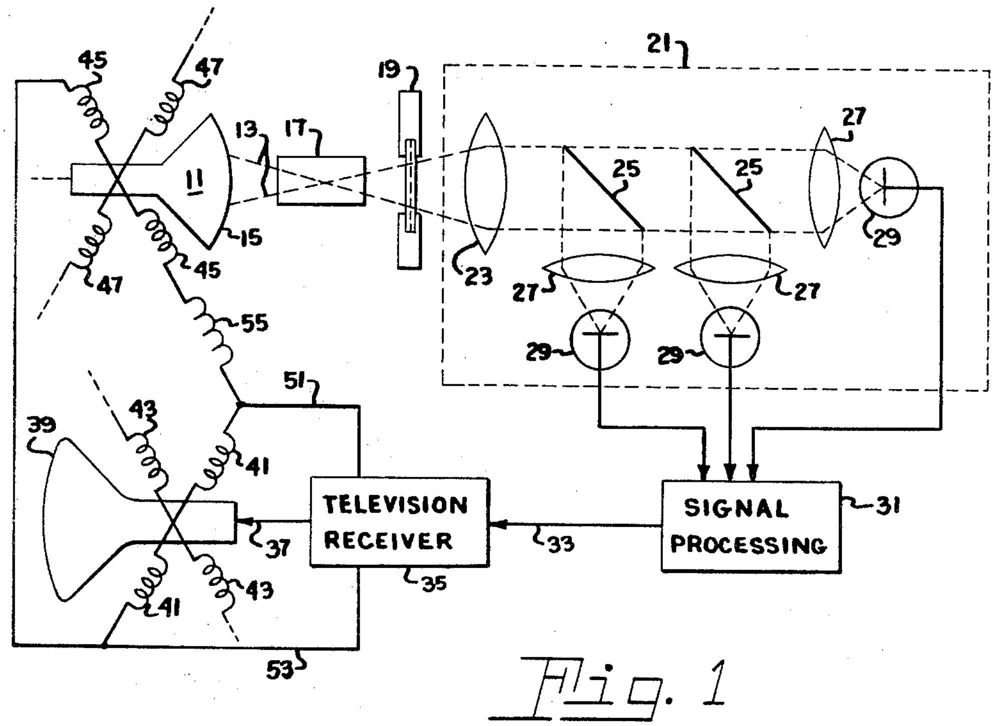
FIG. 1 is a diagram of a color reproduction system in which the present invention finds utility.

Referring first to FIG. 1, the system shown therein includes a flying spot scanner cathode ray tube 11, which generates a moving beam of light, indicated generally as 13, emanating from its faceplate 15. The light passes through an objective lens system 17 and scans the frame of film 19, which is suitably mounted in the system. The light passing through the frame of film enters an optical-to-electrical transducer indicated generally at 21. In the transducer, the light is collected by a condensing lens 23, and passed through first and second dichroic mirrors 25. In a well-known manner, the dichroic mirrors divide the entering light into discrete bands of light representing distinct color components, e.g. red, blue and green. The respective bands of light are then collected by secondary condensing lens, indicated generally as 27, which direct the bands of light to respective photosensitive pickup devices 29, such as photomultiplier tubes. These devices produce electrical signal outputs which vary in amplitude in accordance with the intensity of the light beams which they receive. The outputs from the photosensitive pickup devices are applied to signal-processing circuitry 31, which develops information signals suitable for application to a conventional color television receiver. The signal outputs 33 from the signal processing circuitry 31 are then applied to the television receiver 35, wherein they may be further processed to provide signal outputs 37 to the cathode ray tube display 39 of the receiver. Vertical deflection coils 41 and horizontal deflection coils 43 are mounted on the neck of the cathode ray tube 39, and in similar fashion, vertical deflection coils 45 and horizontal deflection coils 47 are mounted on the neck of the flying spot scanner tube 11.

The vertical deflection coils 41 of the television cathode ray tube 39 and the vertical deflection coils 45 of the flying spot scanner tube 11 are connected in parallel between the source of vertical deflection signals on lines 51 and 53 in the television receiver 35. For reasons which will be explained hereinafter, a compensating coil 55 is connected in series with the vertical deflection coils 45 of the flying spot scanner. The horizontal deflection coils 43 and the horizontal deflection coils 47 may similarly be connected in parallel between the line sources of horizontal deflection signals (not shown) of the television receiver 35. With the deflection coils connected in parallel, respectively, in the above-described manner, synchronizing of the scanning of the television cathode ray tube 39 with the flying spot scanner tube 11 is assured. Also, by utilizing a single source, e.g. the television receiver, for the deflection signals, the system has inherent economic advantages.

However, it is also desirable that the basic television receiver design be relatively unaffected when utilized in the system of FIG. 1. Therefore, the scanner tube deflection coils should have a relatively high impedance compared to the impedance of the television picture tube deflection coils, preferably approximating an order of magnitude higher. At the same time, the inductance to resistance (L/R) ratio of the scanner coils should approximate the L/R ratio of the receiver deflection coils in the respective horizontal and vertical deflection circuits. This is necessary in order to obtain a linear deflection current in the scanner deflection coils to match the established linear current in the receiver deflection coils. Because of the difference in size of the deflection yokes in the scanner and the receiver, as a practical matter the scanner deflection yoke cannot be designed to get the optimized L/R ratio approximating that of the receiver deflection yoke, although the problem is only of major significance in the vertical deflection system because of its relatively low frequency of operation.

Figure 2:
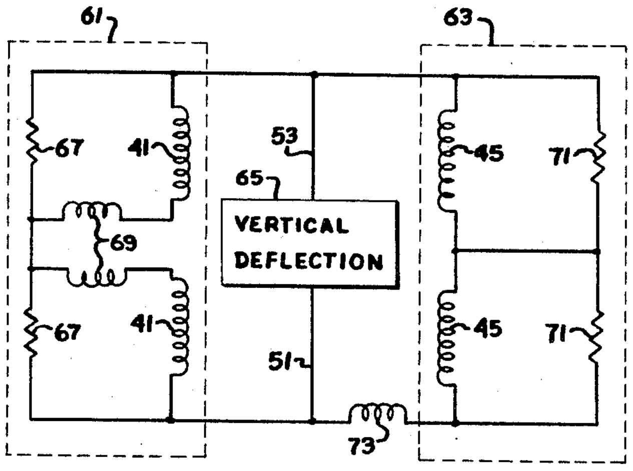
FIG. 2 is a schematic circuit diagram of a parallel deflection yoke system according to the present invention.

The vertical deflection system illustrated schematically in FIG. 2 shows one means for overcoming the above-mentioned problem. The vertical deflection circuitry 61 for the receiver cathode ray tube is connected in parallel with the vertical deflection circuitry 63 of the scanner tube between the outputs 51 and 53 from the vertical deflection signal source 65 of the television receiver. The receiver circuitry 61 is relatively standard with damping resistors 67 connected in parallel with the vertical deflection coils 441. In addition, pincushion correction coils 69 are connected in series with the deflection coils 41.

In the scanner circuitry 63 the deflection coils 45 are designed to have the desired high impedance so as not to effect the operation of the receiver deflection circuitry. Also, suitable damping resistors 71 are connected in parallel with the deflection coils 45. While the scanner vertical deflection circuitry 63 does not have an acceptable L/R ratio, it has been found that this can be overcome by adding a coil 73 in series with the scanner vertical deflection circuitry 63 between the outputs 51, 53 from the source of vertical deflection signals 65. The coil 73 is chosen to have a relatively high inductance and a relatively low resistance. This has the effect of raising the L/R ratio of scanner vertical deflection system to an acceptable level approximating the L/R ratio of the receiver deflection system.

It is therefore apparent that applicant has provided an enhanced deflection system for a color reproduction system, which is economical in design and reliable in operation. By optimizing the scanner vertical deflection circuitry to approximate that of the receiver deflection circuitry, the system provides a relatively simple synchronized scanning of the receiver cathode ray tube with the flying spot scanner cathode ray tube, yet does not appreciably affect the basic television receiver design.

While there have been shown and described what are at present considered the preferred embodiments of the invention, it will be obvious to those skilled in the art that various changes and modifications may be made therein without departing from the scope of the invention as defined by the appended claims.

I claim:

1. In a color reproduction system including a flying spot scanner cathode ray tube adapted to scan a frame of film, an optical-to-electrical signal transducer operative to provide electrical signal components representative of the image of the frame of film being scanned, signal-processing apparatus operative to suitably translate the electrical signal components and a television receiver adapted to receive the translated electrical signal components and thereby display the image of the frame of film on the cathode ray display tube of the television receiver, wherein the television receiver includes sources of horizontal and vertical deflection control signals, deflection circuitry for said color reproduction system comprising:
  - a first deflection yoke assembly including horizontal and vertical deflection coils adapted to be mounted on the flying spot scanner cathode ray tube;
  - a high inductance, low resistance coil connected in series with the vertical deflection coils of said first deflection yoke assembly;
  - a second deflection yoke assembly including horizontal and vertical deflection coils adapted to be mounted on the television receiver cathode ray tube;
  - means connecting the horizontal deflection coils of said first deflection yoke assembly in parallel with the horizontal deflection coils of said second deflection yoke assembly;
  - means connecting the vertical deflection coils of said first deflection yoke assembly and the series connected high inductance, low resistance coil in parallel with the vertical deflection coils of said second deflection yoke assembly;
  - means for apply the source of horizontal deflection control signals to the parallel connected horizontal deflection coils of said first and second deflection yoke assemblies; and
  - means for applying the source of vertical deflection control signals to the parallel connected vertical deflection coils of said first and second deflection yoke assemblies.

2. The invention according to claim 1 wherein the impedance of the vertical deflection coils of said first deflection yoke assembly is approximately an order of magnitude higher than the impedance of the vertical deflection coils of said second deflection yoke assembly at the frequency of the vertical deflection control signals.

3. The invention according to claim 1 wherein the inductance to resistance ratio of the series-connected vertical deflection coils and high inductance, low resistance coil of said first deflection yoke assembly is approximately the same as the inductance to resistance ratio of the vertical deflection coils of said second deflection yoke assembly.

4. In a color reproduction system including a flying spot scanner cathode ray tube adapted to scan a frame of film, an optical-to-electrical signal transducer operative to provide electrical signal components representative of the image of the frame of film being scanned, signal processing apparatus operative to suitably translate the electrical signal components and a television receiver adapted to receive the translated electrical signal components and thereby display the image of the frame of film on the cathode ray display tube of the television receiver, wherein the television receiver includes sources of horizontal and vertical deflection control signals, deflection circuitry for said color reproduction system comprising:
  - a first deflection yoke assembly including a pair of horizontal deflection coils connected in series and a pair of vertical deflection coils connected in series adapted to be mounted on the flying spot scanner cathode ray tube;
  - first and second resistors respectively connected in parallel with each of the pair of vertical deflection coils of said first deflection yoke assembly;
  - a second deflection yoke assembly including a pair of horizontal deflection coils connected in series and a pair of vertical deflection coils connected in series adapted to be mounted on the television receiver cathode ray tube;
  - third and fourth resistors respectively connected in parallel with each of the pair of vertical deflection coils of said second deflection yoke assembly;
  - a high inductance, low resistance coil connected in series with the vertical deflection coils of said first deflection yoke assembly;
  - means connecting the series-connected horizontal deflection coils of said first deflection yoke assembly in parallel with the series connected horizontal deflection coils of said second deflection yoke assembly;
  - means for applying the source of horizontal deflection control signals to the parallel connected horizontal deflection coils of said first and second deflection yoke assemblies;
  - means connecting the series-connected vertical deflection coils of said second deflection yoke assembly in parallel with the series connected vertical deflection coils of said first deflection yoke assembly and said high inductance, low resistance coil; and
  - means for applying the source of vertical deflection control signals to the parallel connected vertical deflection coil configurations of said first and second deflection yoke assemblies.

5. The invention according to claim 4 wherein the impedance of the vertical deflection coils in parallel with said first and second resistors all in series with said high inductance, low resistance coil of said first deflection yoke assembly is approximately an order of magnitude higher than the impedance of the vertical deflection coils in parallel with said third and fourth resistors of said second deflection yoke assembly at the frequency of the vertical deflection control signals.

6. The invention according to claim 4 wherein the inductance to resistance ratio of the series connected vertical deflection coils of said first deflection yoke assembly in series with said high inductance, low resistance coil is approximately the same as the inductance to resistance ratio of the series connected vertical deflection coils of said second deflection yoke assembly.

PO-1050
(5/69)

UNITED STATES PATENT OFFICE
CERTIFICATE OF CORRECTION

Patent No. 3,548,099 Dated December 15, 1970

Inventor(s) George Cleveland Waybright

It is certified that error appears in the above-identified patent and that said Letters Patent are hereby corrected as shown below:

Column 1, line 49 of the specification - after "frame" the words "of film" were left out.

Column 3, line 9 of the specification "441" should read - - 41 - - .

Column 3, line 72 of the Claims in the specification - "apply" should read - - applying - - .

SIGNED AND SEALED
MAR 9 1971

(SEAL)
Attest:

Edward M. Fletcher, Jr.
Attesting Officer

WILLIAM E. SCHUYL
Commissioner of P